May 10, 1966     D. A. WENGER     3,250,036
LINE-HOLDING SIGNAL ATTACHMENT FOR FISHING RODS
Filed Sept. 16, 1964
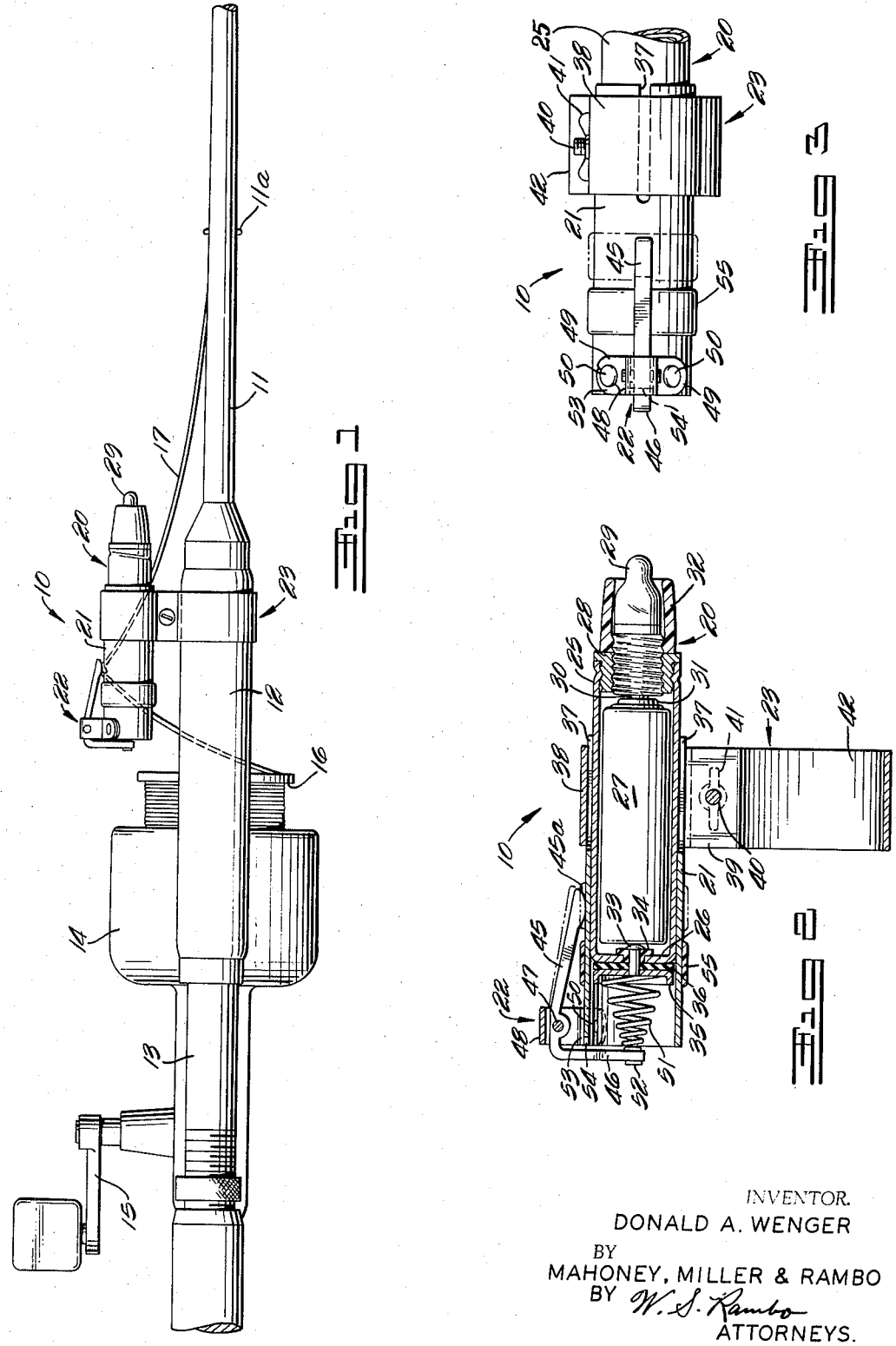
INVENTOR.
DONALD A. WENGER
BY
MAHONEY, MILLER & RAMBO
BY W. S. Rambo
ATTORNEYS.

United States Patent Office 3,250,036
Patented May 10, 1966

1

3,250,036
LINE-HOLDING SIGNAL ATTACHMENT FOR
FISHING RODS
Donald A. Wenger, 121 N. Davis Ave.,
Columbus, Ohio 43222
Filed Sept. 16, 1964, Ser. No. 396,918
6 Claims. (Cl. 43—17)

This invention relates, in general, to a line-holding and signaling device for fishing rods and, more particularly, to an improved line-gripping and electrical circuit switching mechanism therefor having novel means for adjusting the clamping pressure of the line-gripping mechanism.

The line-holding and signaling device of this invention, as indicated above, is designed for utilization with fishing rod and reel assemblies and has the dual function of releasably holding the fishing line and to provide a signal upon the simultaneous releasing of the line. Conventional fishing reels of either the spinning- or casting-type are equipped with a brake mechanism which may be actuated to prevent the unreeling or stripping of the line from the reel. However, in many instances, the most advantageous operation is obtained when the brake mechanism is released which permits the line to be readily unreeled or stripped from the reel whenever a fish strikes. This is particularly desirable where the rod may not be continuously held by the fisherman, as in a boat or where more than one rod is utilized at any one time, and the rod is merely laid on a convenient supporting structure with the hook in the water. In this instance, should the brake mechanism be set, a fish striking the hook could drag the entire rod into the water where it may be lost. With the hook thus trailing in the water, the force of the water currents acting on the hook will tend to cause an undesired stripping of the line from the reel. Accordingly, devices have been previously constructed to accomplish the objective of releasably holding the line against such forces as water currents but automatically releasing the line whenever a fish strikes. Also, a strike signaling device has generally been incorporated into the prior art devices to facilitate night fishing. These prior art devices have not been found completely satisfactory in that it is necessary to provide for adjustment of the pressure with which the line is gripped to accommodate variations in the force of the water currents that may be encountered. Adjustment of this pressure by the known prior art devices is not readily accomplished and, therefore, these devices are not capable of being utilized to their optimum advantage.

It is, therefore, the primary object of this invention to provide a line-gripping and signaling device for a fishing rod of improved construction having a novel mechanism for adjusting the pressure with which the line may be held.

It is another object of this invention to provide a line-gripping and signaling device having a tubular sleeve with a line-gripping and electrical switch mechanism mounted thereon and an illuminable lamp assembly including a housing adapted to be telescopically disposed in the sleeve for selective, axial movement and having novel means for adjusting the pressure of the line-gripping mechanism for releasably holding the line through relative axial movement of the sleeve and housing.

It is a further object of this invention to provide a line-gripping and signaling device having a telescopically assembled supporting sleeve and housing including an illuminable lamp assembly adapted for selective, axial movement with a line-gripping and electrical switch mechanism including a pivotally supported lever for releasably clamping the line against the sleeve which is carried by the sleeve and wherein the clamping pressure of the lever may be readily adjusted through relative axial movement of the sleeve and housing.

These and other objects and advantages of the present invention will be readily apparent from the following detailed description of an embodiment thereof and the accompanying drawing.

In the drawing:

FIGURE 1 is a fragmentary top plan view of a fishing rod having a spinning reel mounted thereon showing an embodiment of the line-gripping and signaling device of this invention in operative relationship thereto.

FIGURE 2 is an enlarged, medial sectional view of the device of FIGURE 1 taken along the longitudinal axis.

FIGURE 3 is a fragmentary, top plan view of the device as shown in FIGURE 2.

Having reference to the drawing, and particularly FIGURE 1, an embodiment of the invention, denoted generally by the numeral 10, is shown operatively mounted on a fishing rod and reel assembly of well-known construction. The fishing rod comprises a flexible shaft 11 attached to a handle 12 which is formed with a reel-mounting section 13. Rigidly secured to the handle 12 at the mounting section 13 is a fishing-line reel 14 which is shown as being of the spinning-type having a hand-crank 15 and a rotatable reel structure 16. Wound on the reel 16 is a quantity of fishing line 17 having a free end which extends forwardly along the flexible shaft 11 through the usual guides 11a. Although the reel 16 is shown as being of the spinning-type, it is to be understood that the casting-type reels may also be utilized with this invention and it is not intended that the specific details of construction of the illustrated rod and reel assembly be a limitation on the scope of the invention.

The illustrated embodiment of the line-holding and signaling device 10 is shown in FIGURE 1 attached to the handle 12 in operative relationship to the reel 16. One of the primary functions of the device is to releasably grip the fishing line 17 and prevent its being stripped from the reel in response to the drag forces imposed by water currents when the usual braking mechanism of the reel has been released. The line-gripping mechanism incorporates means to permit selective adjustment of the pressure with which the line is held and releasably restrain the line against a specific force. The device is also designed to provide a signal to the fisherman whenever the line 17 is released by the novel line-gripping mechanism. An electrical illuminating device is also incorporated in the structure for the purpose of providing a visual signal which is particularly effective during the night time. An electrical switch controlling the operation of the illuminating device is integrally constructed with the line-gripping mechanism and is selectively actuatable upon release of the line by the gripping mechanism.

In accordance with this invention, the line-holding and signaling device 10 comprises an illuminable lamp assembly 20, a tubular sleeve 21 adapted to be telescopically assembled with the lamp assembly, and an adjustable, line-gripping and electrical switch mechanism 22. The latter mechanism 22 is carried by the sleeve 21 in mechanically operative relationship to the lamp assembly 20 whereby relative telescopic movement of the sleeve and lamp assembly will effect the desired adjustment of the mechanism. A supporting bracket 23 is secured to the sleeve 21 and is rigidly engageable with the handle 12 of the fishing rod for supporting the device in operative relationship to the fishing reel 14.

The illuminable lamp assembly 20 is similar in construction to the well-known pen-light type flashlight which utilizes a single dry-cell battery. It includes an elongated housing 25 which may be of cylindrical-tubular shape having an end wall 26 integrally formed at one end thereof. The length of the housing is substantially greater than that of a battery 27 with an internal screw-thread formed at the open end. A threaded adaptor ring 28 for mounting an electric lamp or bulb 29 is threaded into the housing to maintain the base center contact 30 of the bulb in electrically conducting relationship with a center terminal 31 of the battery 27. In the present embodiment, the housing 25 and the adaptor ring 28 are fabricated from an electrically conducting metal to form an electrical circuit with the base ferrule of the lamp 29. A suitable shield 32 may be provided for the protection of the lamp 29 and directing of the light rays. The shield, as illustrated, comprises a short, cylindrical tube fabricated from a translucent, plastic material.

A second terminal of the battery 27, the base of the battery, is positioned in electrically conducting relationship to a contact 33 carried by the end wall 26 of the housing 25. The contact 33 consists of an electrically conducting rivet which extends through and is rigidly fixed in the end wall 26 but is electrically insulated therefrom by a flanged insulator bushing 34. Rigidly affixed to the contact 33 exteriorly of the housing 25 is a circular terminal plate 35 formed from an electrically conducting material and it is substantially coextensive with end wall 26 but does not contact the interior wall surface of the sleeve 21. An annular rim is provided about the periphery of the plate 35 thereby forming a cup-shaped recess. Interposed between the opposed surfaces of the plate 35 and the end wall 26 is a disc-shaped insulator 36 to further prevent the contact 33 from forming a direct circuit to the housing 25.

The tubular sleeve 21 is of elongated, cylindrical form with the internal diameter thereof being substantially equal to the external diameter of the housing 25 but adapted to telescopically receive the lamp assembly 20. Both ends of the sleeve 21 are open with a plurality of axially extending slots 37 formed in the forward marginal end portion from which the lamp assembly projects. In the present embodiment, there are two such slots 37 formed in diametrically opposed portions of the sleeve wall and which permit the forward marginal end portion of the sleeve to be compressed into frictional, clamping engagement with the housing 25. When thus compressed, the lamp assembly 20 will be maintained in fixed relationship with the sleeve 21 but may be readily adjusted to a different telescopically assembled position upon release of the compressing force. Preferably, the sleeve 21 is fabricated from an electrically conducting material and will be in electrically conducting relationship to the housing 25 of the lamp assembly when rigidly clamped thereto.

Secured to the sleeve 21 is the supporting bracket 23 which is also utilized to provide the necessary clamping force for maintaining the sleeve in fixed engagement with the lamp assembly housing 25. The supporting bracket 23 comprises a relatively wide, elongated band which is formed with a substantially closed loop 38 at the midpoint thereof. This loop 38 is adapted to encircle the sleeve 21 around the slotted, marginal end portion thereof with the remaining portions of the band extending laterally therefrom and forming a pair of spaced-part ears 39. Extending transversely through the ears 39 is a bolt 40 having a wing nut 41 threaded onto the end and which may be tightened to draw the ears together. As the ears 39 are drawn together, the loop 38 will be drawn tightly about the sleeve 21 and compress the slotted, marginal end portion into frictional engagement with the housing 25 of the lamp assembly. Each terminal end portion of the band is formed into a semi-circular loop 42 for encircling the handle 12 of the fishing rod with the extreme ends being free to overlap and slide by each other, if necessary to accommodate a particular fishing rod handle. Tightening of the bolt 40 and wing nut 41 in rigidly clamping the sleeve 21 and housing 25 together will also simultaneously draw the two semicircular loops 42 together and thereby rigidly clamp the device to the fishing rod.

Mounted adjacent the rear of the sleeve 21 is the line-gripping and electrical switch mechanism 22. In accordance with this invention, the mechanism 22 is of novel construction combining the functions of releasably holding the fishing line and completing an electrical circuit for the illuminable lamp assembly 20 and is adapted to readily permit adjustment of the pressure for gripping the line. Included in this mechanism is a bell-crank type lever having a contact arm 45 and a biasing arm 46. The lever is supported for swinging movement on a pivot pin 47 which is carried by a U-shaped mounting bracket 48 rigidly secured to the exterior of the sleeve 21. Each leg of the mounting bracket 48 is formed with an outwardly turned, rivet-lug 49 which projects laterally from the terminal end of the respect leg. A rivet 50 extending through the wall of the sleeve 21 and the respective rivet lug 49 rigidly secures the mounting bracket 48 to the sleeve.

The contact arm 45 extends a distance axially forward along the exterior of the sleeve 21. The terminal end of the contact arm 45 is provided with an electrical contact 45a which is adapted to engage the exterior wall surface of the sleeve 21 and form an electrically-conducting path therewith. Extending at approximately a right angle to the contact arm 45 is the biasing arm 46 which projects transversely across the open end of the sleeve 21 and terminates at substantially the center thereof. A resilient biasing force is applied to the biasing arm 46 of this lever by a helically-wound compression spring 51 interposed between the terminal plate 35 of the illuminable lamp assembly 20 and the terminal end of the biasing arm. As is shown in FIGURE 2, the compression spring 51 is preferably conically shaped with the base positioned in and retained by the recess formed in the terminal plate 35 and the apex in engagement with the biasing arm 46. The spring 51 is fabricated from an electrically-conducting material and completes the electrical circuit from the lamp assembly to the lever which functions as the movable member of an electrical switch. An electrical contact pin 52 carried by the biasing arm 46 projects into the apex of the spring 51 in electrical engagement therewith and assists in maintaining the spring in proper relationship to the arm. An electrical circuit is maintained between the contact pin 52 and contact 45a of the lever by the lever itself which, in the present embodiment, is fabricated from an electrically conducting material. For this reason, the lever mounting bracket 48 is electrically insulated from the sleeve 21 by the insulator bushings 53 (see FIGURE 3) mounted in the apertures through which the rivets 50 extend. Since the biasing arm 46 is normally positioned relatively close to the end rim of the sleeve 21, a notch 54 opening at the end of the sleeve is formed in the wall of the sleeve to receive the arm without making contact therewith. However, the notch 54 is preferably of a length to permit contact of the sleeve 21 with the biasing arm 46 when the arm is manually pushed inwardly to complete an electrical circuit and provide illumination to facilitate positioning of the line between the contact 45a and the sleeve when fishing at night.

For utilization of the line-holding and signaling device 10 of this invention, the device is first positioned on the fishing rod handle 12 in the desired location relative to the reel 14 by means of the supporting bracket 23. For the illustrated rod and reel assembly, the device 10 is preferably positioned to project laterally from the rod with the sleeve 21 being positioned to also locate the line-gripping and electrical switch mechanism 22 at the side or in a downwardly inclined position. With the device thus positioned, the bolt 40 and wing nut 41 are tightened sufficiently to retain the sleeve 21 in this desired position but permit the illuminable lamp assembly 20 to be telescopically adjusted relative to the sleeve. The lamp assembly 20 may now be moved axially relative to the sleeve 21 to increase or decrease the distance between the terminal plate 35 and the biasing arm 46. As this distance is changed, the effective biasing force of the spring 51 will also be changed accordingly to vary the pressure with which the contact 45a bears against the wall of the sleeve 21. After the lamp assembly 20 has been axially positioned relative to the sleeve 21 to provide what is believed to be the desired contact pressure, the bolt 40 and wing nut 41 of the supporting bracket may be further tightened until the lamp assembly is securely clamped in fixed relationship to the sleeve.

With the sleeve 21 and lamp assembly 20 thus secured in fixed relationhip and the device 10 rigidly secured to the handle 12, the device is ready for utilization. The lever of the line-gripping and electrical switch mechanism 22 is manually pivoted to separate the contact 45a of the contact arm from the wall of the sleeve 21. This interrupts the electrical circuit and the lamp bulb 29 will not be energized. The fishing line 17 is interposed between the contact 45a and the sleeve by drawing a loop thereof upwardly adjacent the sleeve with the apex of the loop positioned between the contact and the sleeve. Releasing the lever from its manually-held position will permit the spring 51 to pivot the lever to its normally biased position but with the line 17 releasably gripped between the contact 45a and the sleeve 21. With the fishing line 17 thus interposed between the contact 45a and the sleeve 21, the electrical circuit for the lamp assembly 20 will continue to be interrupted as a consequence of the electrical insulating properties of the fishing line. Thereafter, should a fish strike, or a similar force be otherwise exerted on the line 17, the line will be pulled from between the contact 45a and the sleeve and may be readily stripped from the reel 16. Simultaneously, the contact 45a will again engage the sleeve 21 and complete the electrical circuit and thereby energize the lamp 29 which visually indicates that a fish has struck.

It is difficult to predetermine the effective force of the water currents and, since the force may vary over a relatively wide range, it is necessary to adjust the pressure of the line-gripping mechanism for each particular situation. This adjustment to obtain the optimum pressure is readily accomplished with the improved device of this invention. The bolt 40 and wing nut 41 of the supporting bracket 23 are preferably tightened sufficiently to rigidly secure the device in the desired position but permit the lamp assembly 20 to be readily displaced telescopically relative to the sleeve 21 through the application of slight, manual force to either increase or decrease the effective biasing force of the spring 51. After the adjustment has been completed, the bolt 40 and nut 41 are again tightened and the adjustment may be tested. Should further adjustment be necessary, this trial and error procedure may be repeated until the optimum setting is obtained.

During daytime fishing operations, the illumination of the lamp 29 is not particularly effective in signaling a strike and visual reference to the gripping of the line 17 by the device is most satisfactory. In order to conserve the electrical charge of the battery, an insulating ring 55 is provided which may be selectively positioned to prevent completion of the electrical circuit. The ring 55 comprises a flat band of insulating material and is slidably mounted on the sleeve 21. Normally, the ring 55 is positioned as illustrated and permits operation of the signaling mechanism as previously described. When it is desired to prevent the normal signaling operation, the ring 55 is slid forwardly to the position indicated in broken lines and prevents engagement of the contact 45a with the sleeve 21. The fishing line 17 will now be clamped between the contact 45a and the insulating ring 55 and the pressure may be readjusted, if necessary, by the procedure described.

It will be readily apparent that the present invention provides an improved line-holding and signaling device for a fishing rod. The novel line-holding and electrical switch mechanism permits the line gripping pressure to be readily adjusted through the simple and positive relative displacement of the sleeve and lamp assembly. The adjustment may be readily and accurately accomplished to obtain the optimum line-gripping pressure for a particular fishing operation.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A line-holding and signaling device for a fishing rod comprising an electrical illuminable lamp assembly having an elongated electrically conducting housing which is adapted to receive a battery and is provided with relatively, electrically insulated contacts connected in circuit with an illuminable lamp, an elongated, tubular, electrically conducting sleeve adapted to telescopically receive said housing and permit relative, longitudinal displacement thereof, said sleeve being provided with means for selectively engaging said lamp assembly and maintaining said assembly in fixed relationship to said sleeve, a line-gripping and electrical switch mechanism including a lever pivotally supported on said sleeve for swinging movement in a plane aligned with the longitudinal axis of said sleeve, said lever having a biasing arm which extends transversely across said sleeve and a contact arm which extends longitudinally of said sleeve, said contact arm being engageable with said sleeve for releasably clamping a fishing line therebetween and being provided with an electrical contact which selectively completes an electrical circuit between said electrically insulated contacts when the fishing line is released, a biasing spring operatively interposed between said biasing arm and said lamp assembly to normally bias said contact arm into clamping relationship with said sleeve for releasably gripping a fishing line and exert a clamping pressure which is selectively adjustable through relative longitudinal displacement of said sleeve and said lamp assembly, and a supporting bracket attached to said device for mounting said device on a fishing rod.

2. A line-holding and signaling device according to claim 1 wherein said lamp assembly housing itself forms one of said contacts and said sleeve is electrically connected directly with said housing when secured in fixed relationship thereto.

3. A line-holding and signaling device according to claim 2 wherein the contact of said contact arm is connected in circuit with one of said housing contacts and is arranged to complete an electrical circuit to said lamp assembly when in contacting engagement with said sleeve.

4. A line-holding and signaling device according to claim 3 and including an insulating ring slidably mounted on said sleeve for longitudinal displacement between a position interposed between said contact arm contact and said sleeve and a position permitting engagement of said contact with said sleeve.

5. A line-holding and signaling device according to claim 1 wherein said sleeve is formed with a plurality of longitudinally extending slots formed in a marginal end portion, with each of said slots opening at the end of said sleeve, said slotted marginal end portion being releasably compressible into clamping engagement with said lamp assembly housing, and said sleeve is provided with clamping means which is operable to compress said slotted marginal end portion into engagement with said housing and thereby maintain said lamp assembly in fixed relationship to said sleeve.

6. A line-holding and signaling device according to claim 5 wherein said clamping means comprises a flexible band which substantially encircles said slotted marginal end portion and includes means for contracting said band.

No references cited.

ABRAHAM G. STONE, *Primary Examiner.*

R. L. HOLLISTER, *Assistant Examiner.*